Nov. 12, 1935.　　　　L. C. FRANK　　　　2,020,938
MATERIAL AND ARTICLE HANDLING MACHINE
Filed July 7, 1932　　　7 Sheets-Sheet 1
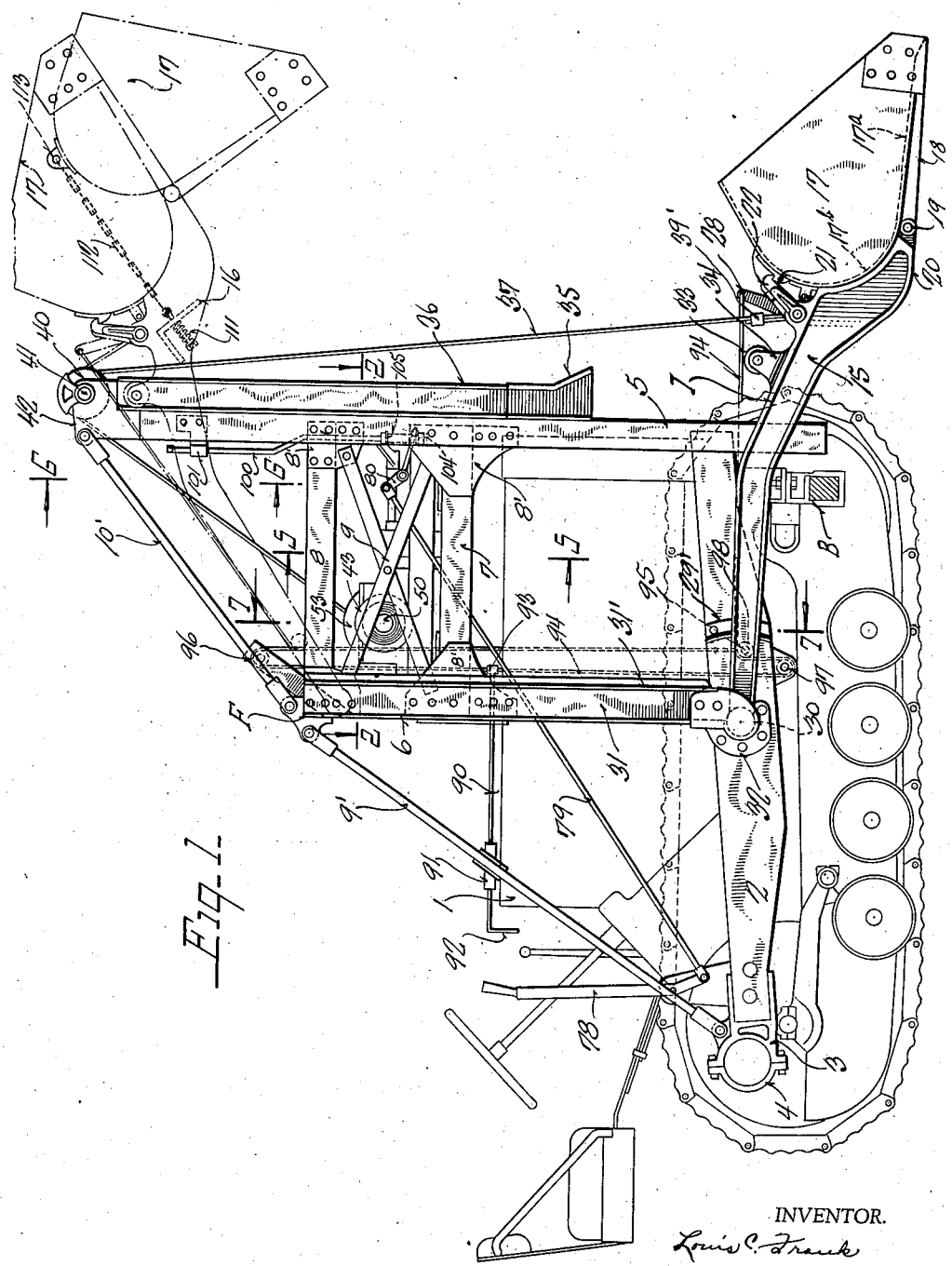
INVENTOR.
Louis C. Frank
BY
ATTORNEYS Nov. 12, 1935.    L. C. FRANK    2,020,938
MATERIAL AND ARTICLE HANDLING MACHINE
Filed July 7, 1932    7 Sheets-Sheet 2
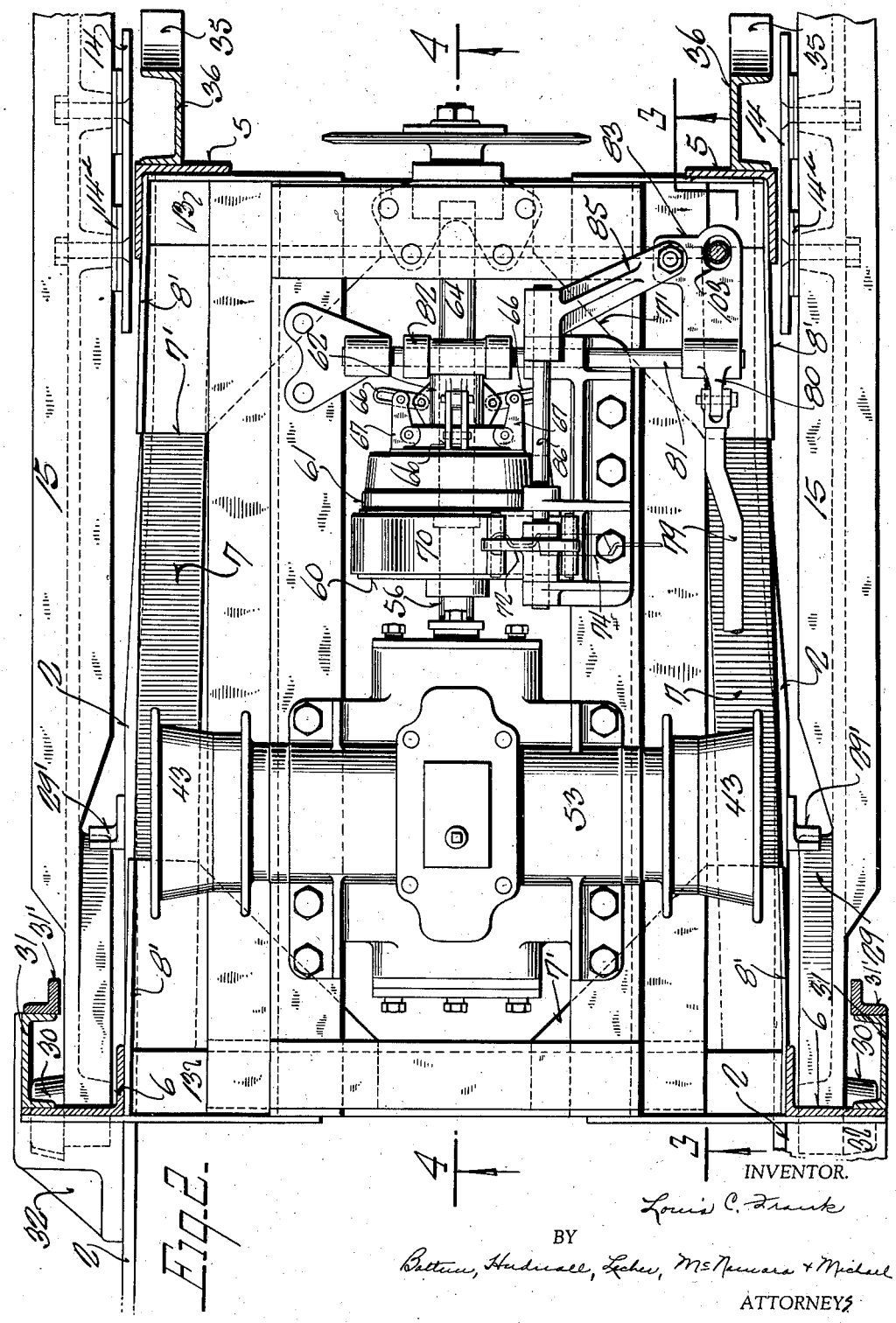
INVENTOR.
Louis C. Frank
BY
Bettwin, Hudnall, Lecher, McNamara + Michael
ATTORNEYS

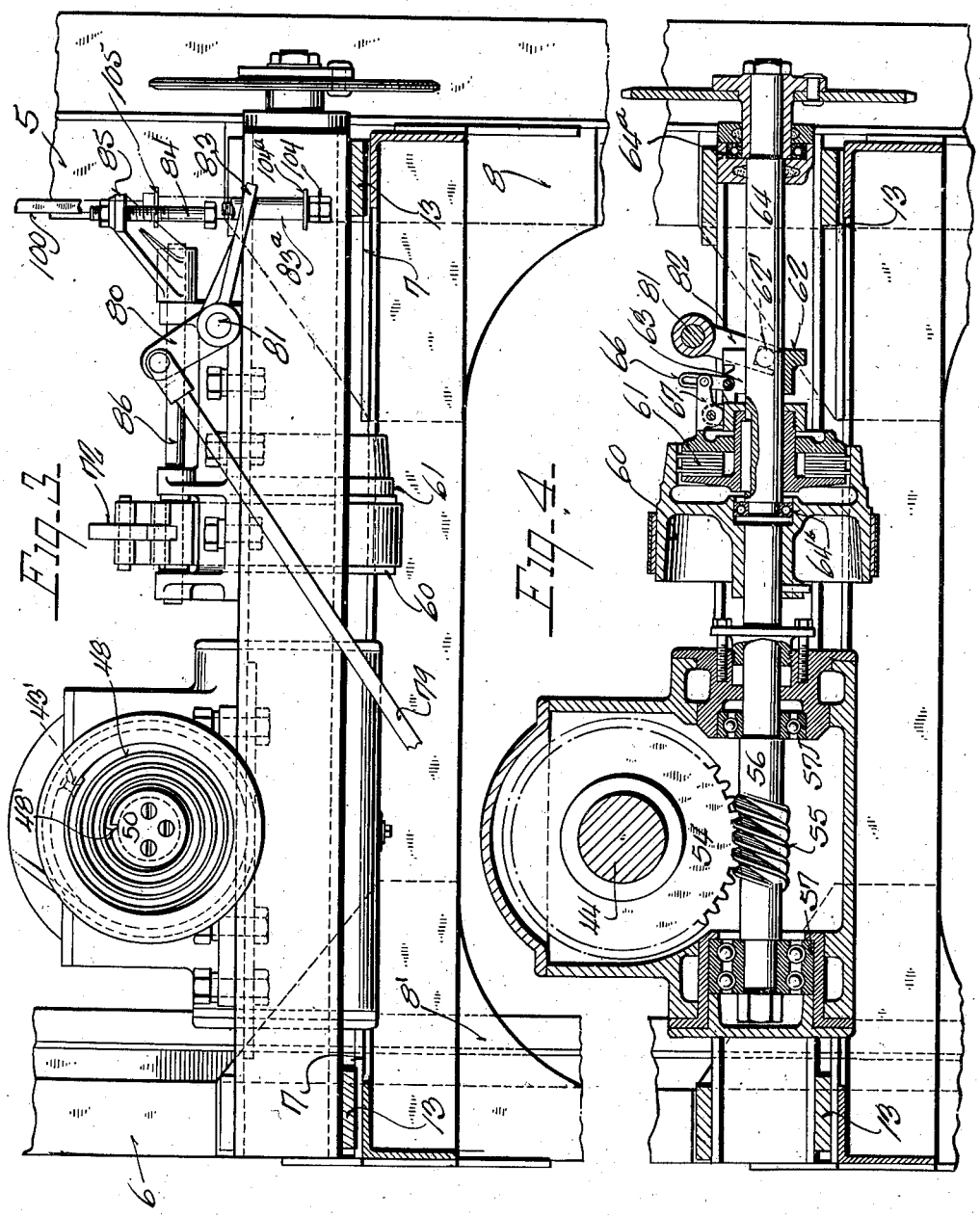

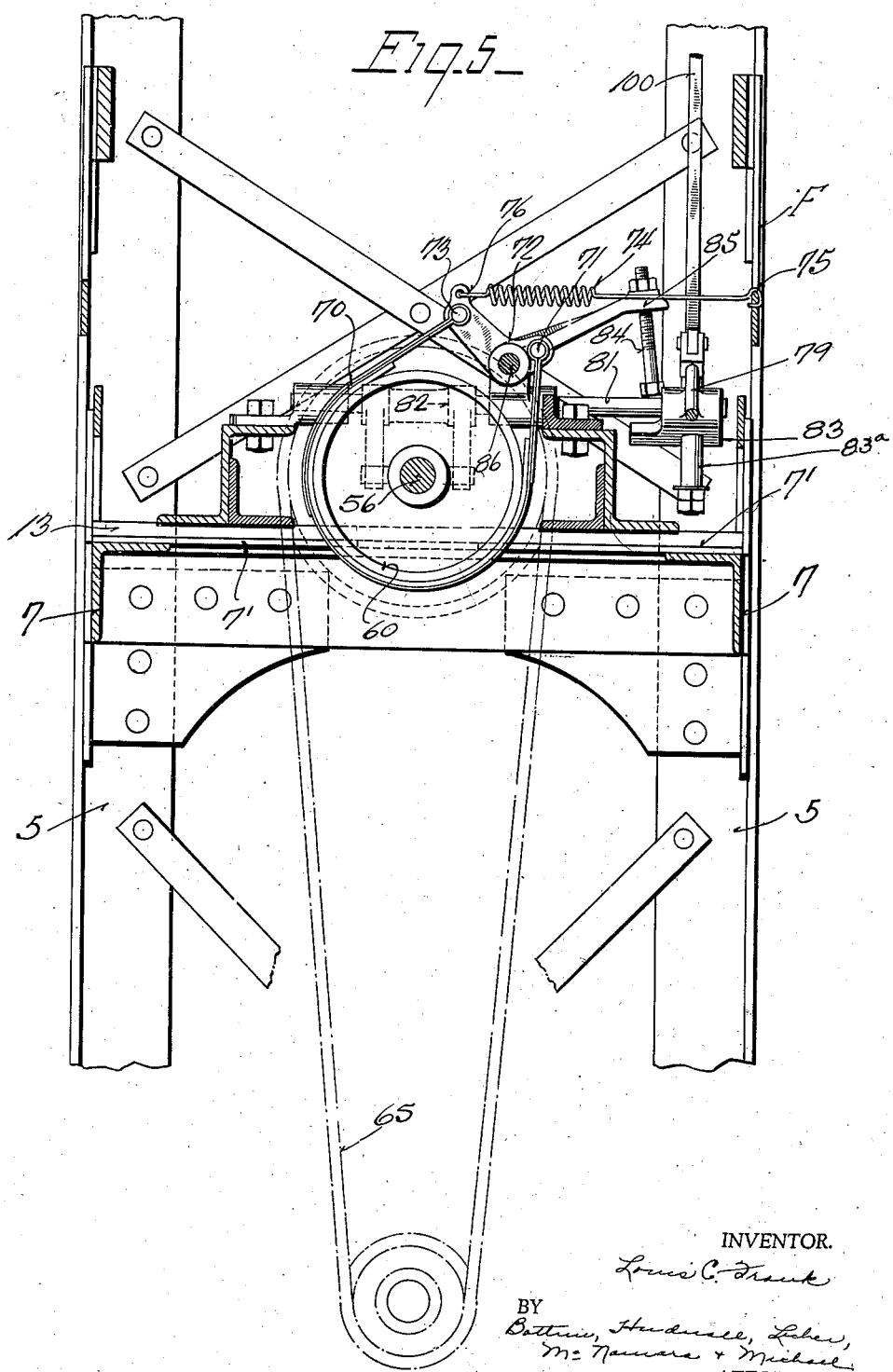

Nov. 12, 1935.　　　L. C. FRANK　　　2,020,938
MATERIAL AND ARTICLE HANDLING MACHINE
Filed July 7, 1932　　　7 Sheets-Sheet 5
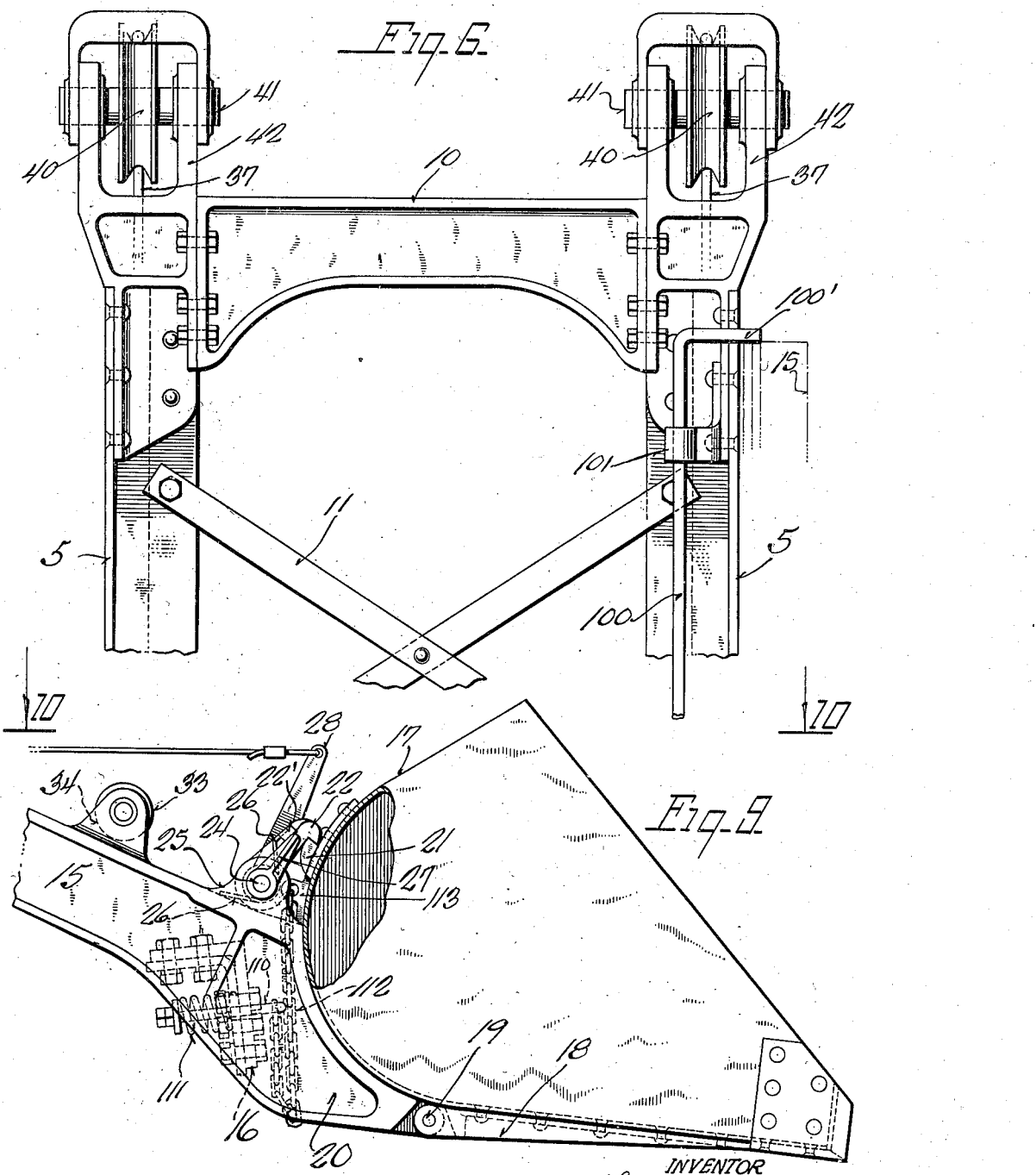
INVENTOR
Louis C. Frank
BY
Bettum, Hudnall, Locker, McNamara & Michael
ATTORNEYS

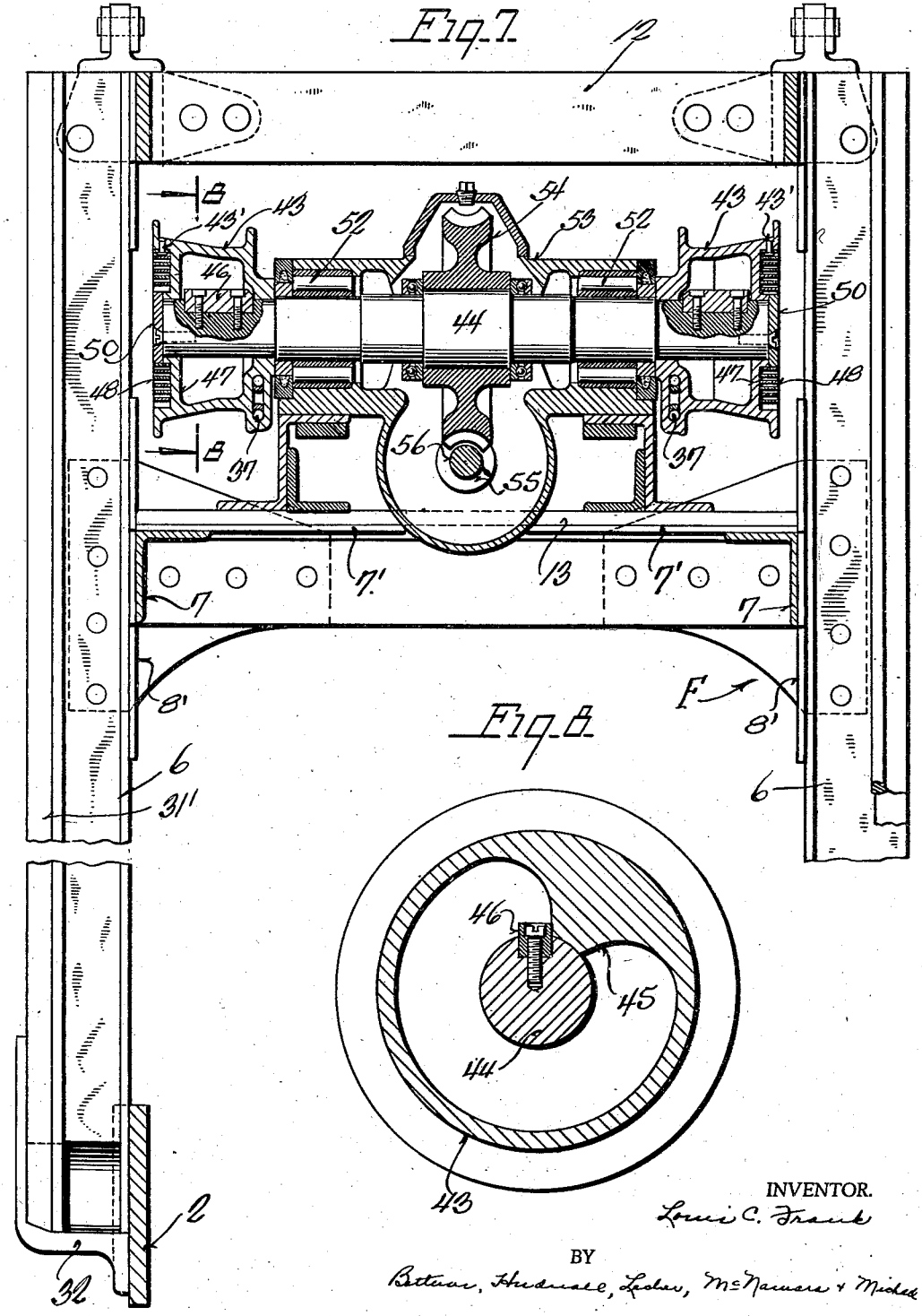

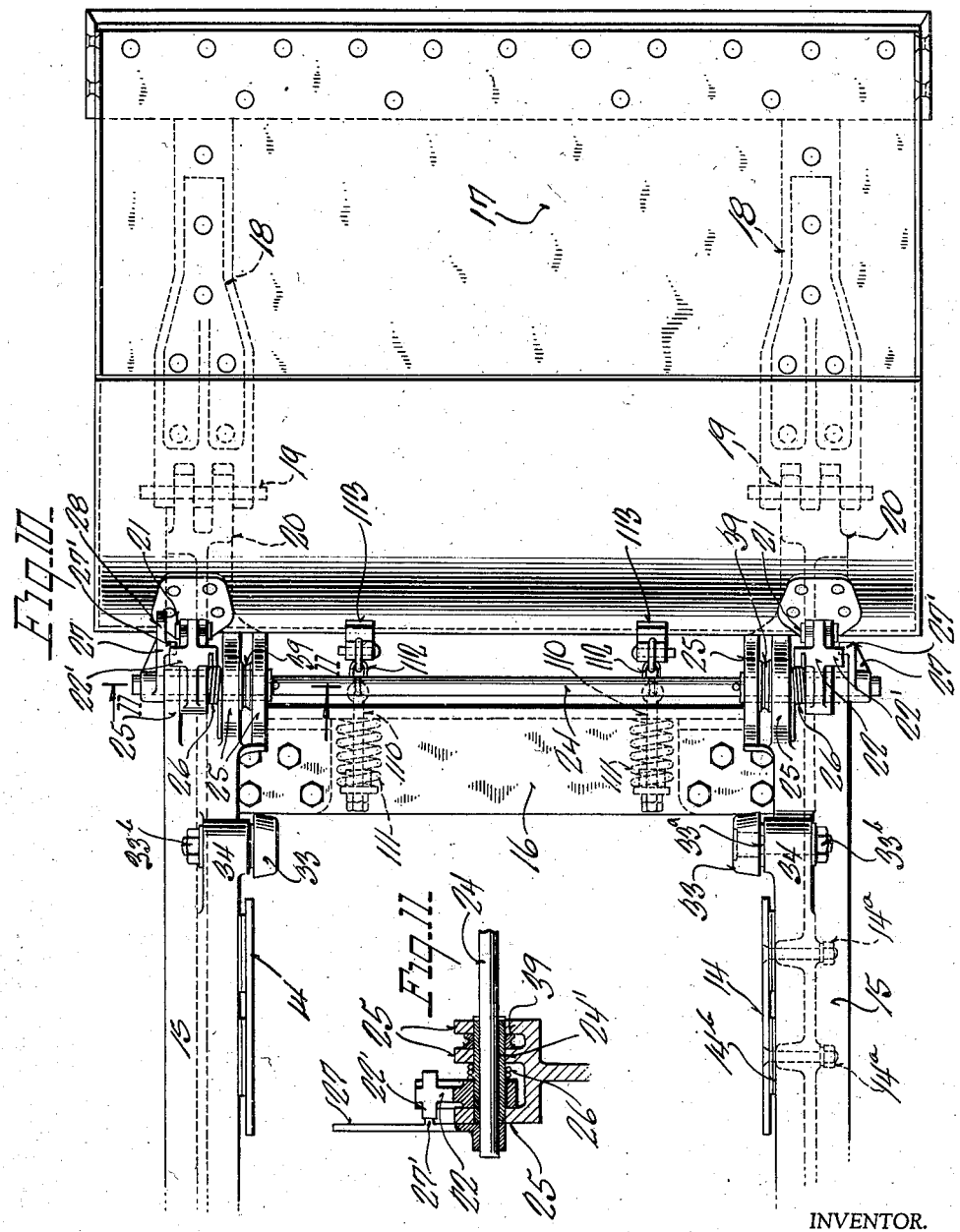

Patented Nov. 12, 1935

2,020,938

UNITED STATES PATENT OFFICE 2,020,938

MATERIAL AND ARTICLE HANDLING MACHINE

Louis C. Frank, Milwaukee, Wis., assignor, by mesne assignments, to Trackson Company, Milwaukee, Wis., a corporation of Wisconsin Application July 7, 1932, Serial No. 621,201

10 Claims. (Cl. 214—140)

This invention relates to an improvement in material and article handling machines and while capable of advantageous use as a shovel or loader is equally well adapted, with slight modifications for use as a crane, a bull-dozer, a back filler, a blade snowplow, a platform loader, or the like.

One of the important objects of the present invention is to provide a machine of this character which is so constructed and so organized that the shovel or other instrumentality carried by the lifting frame or arms may be raised through a substantial vertical distance, that is, to a much higher height than if a purely swinging lifting frame of the same length were employed as in accordance with prior practices.

Another important object of the invention resides in the novel control wherein one lever controls raising, holding and lowering of the bucket or other instrumentality and this with a simple back and forth movement of the lever.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing the loader constructed in accordance with the present invention;

Figure 2 is a view in horizontal section taken on line 2—2 of Figure 1;

Figures 3 and 4 are views in vertical section taken on lines 3—3 and 4—4, respectively, of Figure 2;

Figures 5, 6 and 7 are sectional views taken on lines 5—5, 6—6 and 7—7, respectively, of Figure 1;

Figure 8 is a detail sectional view taken on line 8—8 of Figure 7;

Figure 9 is a fragmentary view partly in elevation and partly in section showing the manner of mounting the bucket or shovel on the lifting frame and of releasably holding the bucket in one position;

Figure 10 is a plan view of Figure 9, as indicated by line 10—10 associated with Figure 9; and Figure 11 is a fragmentary sectional view on line 11—11 of Fig. 10 showing the manner of mounting the bucket hooks.

Referring to the drawings, the numeral 1 designates generally a tractor which may be of any suitable construction. The present invention includes a main frame consisting of two side frame members 2, the rear ends of which are mounted and secured in yokes 3 having removable caps 4, which clamp the yokes to the rear axle housing of the tractor as will be understood from Figure 1. At their forward ends the main framing members 2 are riveted or otherwise suitably secured to vertical angle bars 5 (see Figure 2) which are suitably cross connected and braced, as will be apparent from Figure 6. The frame members 2 are suitably secured to bolster B of the tractor and they may also be connected to the tractor intermediate their ends, if desired. The angle bars 5 constitute elements of a super-structure or framing designated generally at F and which includes not only the angle bars 5 but also a pair of angle bars 6 spaced rearwardly from the angle bars 5, although longitudinally alined therewith. The angle bars 5 and 6 are connected fore and aft by connecting members 7 and 8 and bracing 9 and are connected transversely in any appropriate manner, horizontal gussets 7' and vertical gussets 8' being employed at the points of connection of the framing member, if desired. For example, the angle bars 5 are cross connected at their upper ends by the cross member 10 and are cross braced as indicated at 11 (see Figure 6). The angle bars 6 are connected at their upper ends by a cross member 12 (see Figure 7), and the entire framing F is braced and reinforced by the structural elements designated in Figures 3, 4 and 7 at 13 and constituting the support for the hoisting mechanism as will hereinafter appear. Braces 9' and 10' are also provided. It is to be understood at this point that the framing F may be constructed in any suitable or appropriate manner.

An implement carrying or lifting frame designated generally at I is provided and consists of a pair of lifting arms 15, one at each side of the machine. At their forward ends the lifting arms are cross connected by means of an angle bar or cross member 16. In the construction illustrated, a bucket 17 has runners 18 secured to its bottom and the rearward ends of the runners are pivoted as at 19 to extensions 20 of the arms 15 (see Figures 9 and 10). The bucket 17 is of special construction in that its bottom 17ª slants upwardly and rearwardly from its forward edge and merges into a combined back and top 17ᵇ which first curves rearwardly and upwardly and then curves forwardly and upwardly. The sides of the bucket are vertical and are welded, riveted, or otherwise suitably secured to the bottom and combined back and top. With this construction loading and dumping are facilitated. When the bucket is being filled the material crowds up against the combined back and top wall and is rolled over into the confines of the bucket. Then again when dumping the material readily leaves the bucket since there are no sharp corners or other structure tending to retain it. This construction also enhances the strength of the bucket.

Catch lugs 21 are secured to the back or top of the bucket and are positioned to be engaged by hooks or latches 22 freely pivoted on short sleeves 24' secured in bearings provided therefor in lugs 25 of the arms 15. Springs 26 are provided to urge the hooks 22 into engagement with the catches 21. A shaft 24 is supported for rotation in, and at its ends projects beyond, the sleeves 24'. Dogs 27 are fixed to the ends of the shaft 24 and have lateral projections 27' which engage under corresponding projections 22' formed on the hooks. One of the dogs 27 has a lever 28 integral therewith whereby when the lever is pulled in a counter-clockwise direction as viewed in Figure 9, the shaft 24 will be similarly turned and will act through the dogs 27 to swing the hooks 22 against the action of their springs 26 and out of engagement with the catches 21. This releases the bucket so that it may turn under the influence of gravity about its pivots 19 and dump its load. The means for swinging lever 28 will be described hereinafter.

With the bucket mounted in the manner described, the pitch of the edge of the bucket may be varied to regulate the digging action or to maintain an even grade by interposing fillers or spacers between the combined back and top of the bucket and the seats afforded by the extensions 20 of the arms 15. One practical method of accomplishing this purpose is to form such fillers or spacers as integral extensions of the lugs 21, the spacers being riveted or otherwise suitably secured to the bucket.

The rearward ends of the arms 15 are provided with outwardly projecting guides, preferably rollers 30, which, when the lifting frame is raised, ride in inwardly facing channel guides 31 fastened to the angle bars 6 of the framing F. The flanges of the channel guides 31 remote from the angle bars 6 are reinforced and stiffened by angle guide strips 31'. When the frame I is disposed in its lowermost position, that is, in its digging or scooping position, the rearward ends of the arms are received in and directly abut the walls of sockets 32. These sockets are preferably heavy castings securely fastened to the frame members 2 to the angle bars 6 and to the channels 31, the socket castings 32 serving as connections between the angle bars 6 and channels on the one hand and the frame members 2 on the other. Adjacent their forward ends the arms 15 are provided with inwardly and laterally projecting guides, preferably rollers 33 (compare Figures 1 and 10), the rollers 33 being rotatably mounted on mounting lugs 34 provided therefor on the arms. After the lifting frame has been elevated to a predetermined extent, these rollers 33 enter the flaring lower ends 35 of channel guides 36, which guides are securely fastened to the vertical angle bars 5 of the super-structure F, as will be understood from Figures 1 and 2.

To take care of wear on the lifting arms 15, wearing plates 14 are adjustably supported on these arms and their flat faces are disposed to ride along the surfaces of the angle bars 5. The plates 14 are secured in position by bolts and nuts 14ª and adjustment is effected by using more or less shims 14ᵇ. This expedient, along with the adjustable mounting of the rollers 30 and 33, compensates for inaccuracies in the construction of the main frame and super-structure. The rollers may be adjustably mounted in any suitable way as by employing shims 33ª between the rollers and their mounting means (lugs 34 in Figure 10) and by having nuts and washers 33ᵇ for holding the roller pivots in position.

For raising and lowering the frame I and consequently the bucket 17, or other implement used in lieu thereof, hoisting mechanism is provided 10 and in the construction selected for the sake of example consists of two hoisting lines 37, each of which has one end passed around a pulley 39 mounted on one of the sleeves 24' clamped to the portion of the line leading to the pulley 39 as indicated at 39'. From the point of attachment of the lines to the pulleys 39 they are extended up and over sheaves 40 mounted for rotation and transverse sliding movement on axles 41 of a sheave mounting 42 (see Figures 1 and 6) and then rearwardly and downwardly to hoisting drums 43 to which they are secured (compare Figures 1 and 2). Obviously various arrangements of the hoisting line, other than that shown, may be employed.

The hoisting drums 43 are rotatably mounted on drum shaft 44. The interior of each drum 43 is hollow (see Figures 7 and 8) and provided with an integral or inward projection 45 which is engageable with a key 46 securely fastened to the shaft 44. Thus, each drum 43 is free to partake of nearly a complete revolution relative to its shaft. For the purpose of taking up cable slack, one of the end plates 47 of each drum is inset from the end of the drum to accommodate a coil spring 48, one end of which is fastened to the periphery of its drum 43 as at 43' and the other end of which is interconnected with the shaft 44 by virtue of the provision of a cap plate 50 on each end of the shaft, each cap plate 50 having a notch which is interfitted with the inturned inner end 48' of its spring 48 (see Figure 3). The springs 48 are wound whenever there is any tension on the hoisting cables and are released when the hoisting cables are relieved of tension, whereupon these springs unwind and operate as cable tighteners, taking up slack in the hoisting cables.

The drum shaft 44 is supported for rotation in bearings 52 provided therefor in a gear casing 53 (see Figure 7), the gear casing in turn being supported on and suitably secured to the framing F. Within the gear casing a worm wheel 54 is fixed to the shaft 44 and meshes with a worm 55 formed on or secured to a worm shaft 56 (see Figures 4 and 7). As shown in Figure 4, the shaft 56 is rotatably mounted in bearings 57 provided therefor on the gear casing 53 and at one end extends beyond the gear casing. To the projecting portion of the shaft 56, a combined driven clutch member and brake drum 60 is secured. The member 60 constitutes the driven clutch member of a conventional multiple disc clutch 61, the clutch being engaged and disengaged by sliding a collar 62 along a drive shaft 64, supported for rotation in bearings 64ª and 64ᵇ provided therefor on the super-structure F and in the hub of the combined clutch member and drum 60, respectively.

The drive shaft 64 is rotated in any desired manner from the engine of the tractor. For the sake of simplicity in illustration, a chain and sprocket gearing 65 is illustrated diagrammatically in Figure 5 as effecting this actuation of shaft 64 from a forward extension of the engine crank shaft. Obviously, however, any form of motion transmission means or power take-off may be employed between the engine and the shaft 64.

As indicated, the clutch between the drive shafts 56 and 64 is conventional. This is true with one exception and that is that the links 66 between the collar 62 and the operating levers 67 of the clutch have elongated slots to permit of movement of the collar 62 away from the clutch even after the clutch is completely disengaged for a purpose which will hereinafter appear.

An automatic or self-acting brake cooperates with the combined brake drum and clutch member 60 and is self-applied at all times except when the bucket is being raised or when released manually. The brake includes the usual lined brake band 70 encircling the member 60 and having one end connected as at 71 to the short arm of a lever 72 and having its other end connected as at 73 to the long arm of this lever 72 (see Figure 5). A retractile coil spring 74 has one end anchored on the framing F as indicated at 75, and has its other end interconnected as at 76 with the long arm of the lever 72. The spring tends to swing the lever 72 in a clockwise direction as viewed in Figure 5 and to apply the brake. This action is enhanced by the member 60 which, when the load lowers or tends to lower, rotates or tends to rotate in a clockwise direction, as viewed in Figure 5, thus tending to pull the lever 72 around and in a clockwise direction and effect tightening of the band 70.

To provide for engagement and disengagement of the clutch and application and release of the brake, a single control lever 78 is pivotally mounted on the tractor (see Figure 1). The lower arm of the lever 78 is pivotally interconnected with the lower end of a long rod 79, the opposite end of which rod is pivotally connected to a crank arm 80 fixed to the outer end of the clutch shifter shaft 81. This shaft is supported for rotation in bearings provided therefor on the frame F and has fixed thereto the clutch shifting fork 82 which extends downwardly therefrom and embraces the trunnions 62' of the shifting collar 62, as will be understood from Figures 2 and 4. The crank arm 80 has an integral plate-like extension 83 also functioning as a lever and disposed beneath stud 84 adjustably secured to a crank arm 85 which is fastened to one end of a brake shaft 86. This brake shaft 86 is rotatably supported in bearings provided therefor on the framing F and it is secured to and provides the fulcrum of the lever 72. When the control lever 78 is pushed forwardly its lower end pulls rearwardly on the rod 179 thereby turning the clutch shaft 81 in a counterclockwise direction, as viewed in Figure 4, to cause disengagement of the clutch. If this forward movement is continued, the lever 80 continues to swing in a counter-clockwise direction as viewed in Figure 3, until its plate-like crank member 83 pushes upwardly on the stud 84 and thereby rotates the brake shaft 86 in a counterclockwise direction, as viewed in Figure 5, to swing the long arm of lever 72 toward drum 60 and release the brake. If the bucket lowers too fast the operator merely moves the operating lever 78 rearwardly as viewed in Figure 1, and this disengages the crank member 83 from the stud 84 and permits the spring 74 and the automatic action of the brake to apply the brake. When the clutch is to be engaged to cause the hoist mechanism to raise the lifting frame, the operator pulls rearwardly on the control lever 78 thereby moving the crank arm 80 and clutch shaft 81 in a clockwise direction as viewed in Figure 3 and similarly swinging the clutch shifter 82, as viewed in Figure 4. This engagement of the clutch causes rotation of the shaft 56 in a counter-clockwise direction, as viewed in Figure 5, and since this tends to move the long arm of the lever 72 toward the drum, the band 70 is slackened or loosened at least to such an extent that no appreciable or material drag is exerted with the band on the drum member 60. If the lever is disengaged and allowed to return to neutral position and the load starts to lower the brake is automatically applied and the lifting frame and bucket held in the position it then occupies.

In order to enable the operator to conveniently trip the bucket and thereby dump or discharge its contents a rod 90 is slidably mounted on the machine in a bearing 91 provided therefor and has a handle portion 92 adjacent the operator (see Figure 1). The forward end of the rod is connected as at 93 with a vertical run of a cable 94. One end of this cable is dead-ended on the pin 95 which serves as the axis of pulley 96. The cable runs from its dead-end 95 up over idler pulley 96, and then downwardly and under an idler pulley 97 and then up and around an idler pulley 98. From the idler pulley 98 the cable 94 extends to the point of its connection with the lever 28. By pulling rearwardly on the handle 92 the rod 90 moves rearwardly and pulls on the cable 94. This causes the cable 94 to pull on the lever 28 and rotate the lever 28 and its shaft 24 to cause the hooks 22 to disengage the catches 21. When these hooks disengage the catches the bucket is released and swings about its pivots 19 under the influence of gravity.

In operation, when scooping or digging, the bucket 17 and lifting frame 1 are in the position shown in Figure 1. At this time the rearward ends of the arms 15 abut directly against the walls of the sockets 32 so that the thrust exerted is taken direct to the main frame members 2 through the heavy socket castings. The rollers 30 and their mounting pins are relieved of all strain. It is to be understood, of course, that the tractor pushes the bucket or shovel forwardly until it is filled. When the bucket is to be elevated for transportation or for dumping, the control lever 78 is pulled rearwardly to throw in the clutch and complete the drive from the engine to the hoist drums 43. Rotation of the hoist drums takes up on the cables or hoist lines 37 and causes them first to raise the lifting frame with the arms 15 rotating in the sockets 32 as their fulcrums. This action continues until the rollers 33 enter the flaring ends of the guides 35. The arms 15 are now at an angle to the vertical and as the hoisting continues the lower rearward ends of the arms 15 will be withdrawn from the sockets 32 and the rollers 30 will pass into the guides 31. The lifting frame and the bucket thereafter move bodily vertically until the lifting frame reaches the extreme upper limit of its travel or until the operator throws out the clutch. When the proper elevation of the bucket has been effected, the operator pulls rearwardly on the handle 92 to disengage the hooks or latches 22 from the catches 21 whereupon the bucket, due to the way it is balanced, that is, to the manner of its mounting, will dump by gravity. To absorb the shock due to the forceful opening or dumping of the bucket, one or more eye-bolts 110 are slidably mounted on the cross angle 16 between the arms 15 and are biased rearwardly by springs 111. Chains 112 connect the eye-bolts 110 to lugs 113 on the bucket. As the bucket approaches full dumping position, the slack in the chain is taken up and the springs 111 are compressed and absorb the shock.

If the operator neglected to throw out the clutch when hoisting, this will be done automatically. For effecting automatic throw-out of the clutch at the proper time, a clutch trip rod 100 is supported for vertical sliding movement in a guide 101 provided on the framing F (see Figures 1 and 6). The upper end of this rod is outturned as at 100' so as to lie in the path of movement of one of the arms 15. The lower end of the rod 100 passes loosely through an opening 103 provided therefor in the crank member 83 (see Figures 2 and 3). Above and below the member 83 nuts 104 and 105 are threaded on the rod 100. The nuts are spaced from each other by pipe 83ᵃ and are also spaced from the crank member 83 sufficiently to allow free operation and control of the hoisting mechanism from the control lever 80 without moving rod 100 except when the extreme limit of bucket travel is reached. However, when the lifting frame I approaches the extreme upper limit of its travel, one of the arms 15 engages the outturned portion of the rod 100 and lifts the rod until the washer 104ᵃ of the lower nut 104 engages the crank member 83 and shifts the same to cause it to disengage the clutch and allow application of the brake.

When the bucket is lowered, the rollers 30 and 33 travel downwardly through their channel guideways 31 and 36, respectively, and just as the rollers 33 leave their guideways 36 the rearward ends of the arms 15 and the rollers 30 pass into the sockets 32, this action occurring under the influence of cooperating arcuate guides 29 and 29' provided on the arms 15 and frame members 2, respectively (see Figures 1 and 2). These guides have such extent that they are engaged and effective only during the time that arms 15 are swinging in an arc whereby they hold the rearward ends of the arms 15 in the sockets 32 and preserve the proper swinging movement. Forward movement of the arms 15 out of the sockets 32 is precluded until the rollers 33 enter guideways 35 whereupon the guides 29 and 29' are disengaged to allow the forward movement desired.

While I have shown and described one type of machine, it is to be understood that this type has been selected merely for the purposes of illustration and example and that the invention and various novel features thereof may be advantageously embodied in various types of machines as above pointed out, and further that various changes in size, shape and arrangement of the parts may be made without departing from the spirit of the invention or the scope of the subjoined claims.

The invention claimed is:

1. In combination with a tractor, a frame mounted thereon, a carrying member, releasably engageable pivotal providing and guiding elements on the frame and carrying member, respectively, for interconnecting said carrying member and said frame to constrain said carrying member, when elevated, first to a swinging movement about the pivotal axis provided by said pivotal providing elements when engaged and then to a bodily upward movement disconnected from said axis on engagement of said guiding elements, the pivot for the carrying member being vertically movable therewith, and hoisting mechanism connected to said carrying member for elevating the same.

2. In combination with a tractor, a frame mounted thereon, an implement carrying member, means interconnecting said member and said frame to constrain said member, when elevated, first to swinging and then to bodily upward movement and consisting of longitudinally spaced parallel guides extending substantially vertically, with the forward guide higher than the rearward guide, a socket associated with the lower end of the rearward guide and adapted to receive the rearward end of said member in certain positions thereof and laterally extending guides carried by said member and engageable in said parallel guideways when said member has been swung upwardly through a predetermined distance, and hoisting mechanism connected to the said member for elevating the same.

3. In combination with a tractor, a frame mounted thereon, a lifting member, means interconnecting said lifting member and said frame to constrain said lifting member, when elevated, first to a swinging movement about a pivotal axis and then to a bodily upward movement disconnected from said axis, the pivot for the lifting member being vertically movable therewith, said means comprising interengageable guides and rollers on the frame and lifting member, respectively, for guiding the member in its bodily upward movement and releasably engageable pivotal providing elements on the frame and member to provide the pivotal axis for the swinging movement of the member, and means connected to the frame and cooperable with the lifting member for taking the thrust directly when the lifting member is in lowered position, and hoisting mechansm connected to said lifting member for elevating the same.

4. In combination with a tractor, a fixed frame mounted thereon and secured thereto, an implement carrying member, means interconnecting said implement carrying member and said frame to constrain said member, when elevated, first to a swinging movement about a pivotal axis and then to a bodily upward movement disconnected from said axis, the pivot for the carrying member being vertically movable therewith, said means comprising releasably engageable pivotal providing and guiding elements on the frame and carrying member, respectively, said guiding elements when engaged serving to guide the member in its bodily upward movement and said pivotal providing elements when engaged serving to provide the pivotal axis for the member in its swinging movement, a socket receiving and directly engaged with the rearward end of the implement carrying member when the same is lowered and in position for loading under the direct action of the tractor, and hoisting mechanism carried by the frame and connected to said member.

5. In combination with a tractor, a frame secured thereto and supported thereon, longitudinally spaced parallel guides at each side of the frame, sockets connected to said frame at the lower ends of the rear guide, a pair of arms extending along the sides of the tractor and cross connected forwardly thereof, laterally extending rollers carried by the arms and projecting into said guides after said arms have been raised a predetermined amount, the rearward ends of said arms being received in and engaged with said sockets in the lowered position of said arms, and hoisting mechanism for raising and lowering said arms.

6. In combination with a tractor, front and rear longitudinally spaced parallel guides carried by and extending upwardly with respect to the tractor, a lifting arm having rollers projecting laterally therefrom, said rollers being spaced along said arm a distance greater than the longitudinal spacing of the guides and being fitted in said guides whereby said lifting arm is constrained to move bodily along said guides and in an inclined position relative thereto.

7. In a machine of the character described, an implement carrying frame, hoisting mechanism for raising and lowering said frame, and means constraining said frame to a swinging movement about a pivotal axis in certain phases of its operation and to bodily vertical movement disconnected from said axis in other phases of the operation, the pivot for the frame being vertically movable therewith, said means comprising releasably engageable pivotal providing and guiding elements on the frame and machine, respectively, the guiding elements serving when engaged to guide the frame in its bodily vertical movement and the pivotal providing elements serving when engaged to provide the pivotal axis for the swinging movement of the frame.

8. In combination with a tractor, an implement carrying frame, means connected to the tractor and cooperable with the implement carrying frame for taking the thrust directly when said frame is lowered into position for scooping and digging, hoisting mechanism connected to said frame for raising and lowering the same, and interengageable guides and releasably engageable pivotal providing elements connected to the tractor and to the frame to constrain the frame to a swinging movement about a pivotal axis during certain phases of the operation and to a bodily movement disconnected from said axis during other phases of the operation, the pivot for the frame being vertically movable with the frame in the last mentioned phase of its operation.

9. In a machine of the character described, a swingable frame, a bucket pivoted thereto, catches on said bucket, freely pivoted latches cooperable with said catches for securing said bucket against swinging, dogs co-operable with said latches by direct engagement with the latches for disengaging the latches from said catches and manually operable means for operating said dogs.

10. In a machine of the character described, an implement carrying frame, an implement having an unbalanced pivot support on said frame whereby the implement tends to move under the influence of gravity to discharging position, releasable means for securing the implement in a position to retain its load, and yieldable means and an abutment on the frame, and a flexible connector connecting the yieldable means with the implement for cushioning the shock when the implement swings to discharging position, said yieldable means when cushioning the shock acting on said abutment which is carried by the frame between the yieldable means and its connection with said flexible connector.

LOUIS C. FRANK.